(12) United States Patent
Kippenhahn et al.

(10) Patent No.: US 7,244,505 B2
(45) Date of Patent: Jul. 17, 2007

(54) MULTILAYERED PACKAGING FOR GREASY PRODUCTS

(75) Inventors: Rolf Kippenhahn, Eschenbach (CH); Thomas Luck, München (DE); Claudia Schönweitz, Freising (DE); Peter Pawlak, Zscherndorf (DE)

(73) Assignee: Fraunhofer-Gesellschaft zur Foerderung der Angewandten Forschung E.V. (DE)

( * ) Notice: Subject to any disclaimer, the term of this patent is extended or adjusted under 35 U.S.C. 154(b) by 0 days.

(21) Appl. No.: 10/312,910

(22) PCT Filed: Jun. 29, 2001

(86) PCT No.: PCT/EP01/07456

§ 371 (c)(1),
(2), (4) Date: Jul. 21, 2004

(87) PCT Pub. No.: WO02/02412

PCT Pub. Date: Jan. 10, 2002

(65) Prior Publication Data

US 2005/0008801 A1 Jan. 13, 2005

(30) Foreign Application Priority Data

Jul. 3, 2000 (DE) ............................... 100 32 252
Oct. 6, 2000 (DE) ............................... 100 49 665

(51) Int. Cl.
*B32B 5/16* (2006.01)

(52) U.S. Cl. ...................... 428/480; 428/481; 428/507; 428/511; 428/532; 427/407.1; 427/412.1; 427/417

(58) Field of Classification Search ................ 428/480, 428/481, 507, 511, 532; 427/407.1, 412.1, 427/417
See application file for complete search history.

(56) References Cited

U.S. PATENT DOCUMENTS

| 5,430,140 | A | 7/1995 | Frische et al. |
| 5,514,790 | A | 5/1996 | Frische et al. |
| 6,214,452 | B1 * | 4/2001 | Albrecht et al. ............ 428/220 |
| 6,569,539 | B2 * | 5/2003 | Bentmar et al. ............ 428/532 |
| 6,821,373 | B1 * | 11/2004 | Berlin et al. ............ 156/244.11 |

FOREIGN PATENT DOCUMENTS

| DE | 41 09 983 A1 | 10/1992 |
| DE | 41 37 802 A1 | 5/1993 |
| DE | 42 23 471 A | 1/1994 |
| DE | 42 94 110 T1 | 6/1996 |
| DE | 198 13 29 A1 | 3/1998 |
| EP | 0 579 197 A2 | 7/1993 |
| EP | 609 0013 A | 1/1996 |
| JP | 58 098 251 A | 12/1981 |
| WO | WO 93/11300 | 6/1993 |
| WO | WO 99/58331 A | 11/1999 |

* cited by examiner

*Primary Examiner*—Leszek Kiliman
(74) *Attorney, Agent, or Firm*—Hunton & Williams LLP

(57) ABSTRACT

The invention relates to a multilayered packaging for greasy products or part of said packaging, comprising a carrier layer made of a polymer material as main component and at least one layer placed on said carrier layer that does not form the outer side of the packaging, said layer containing a starch derivative as main component. The invention is characterized in the starch derivative is a starch derivative modified with a $C_2$–$C_6$-alkylene oxide. The invention also relates to the use of a $C_2$–$C_6$-alkylene oxide derivatized starch as main component of a layer of a multilayered packaging, which is placed on a carrier layer made of a polymer material in said packaging with the aim of rendering said multilayered packaging grease-tight.

15 Claims, No Drawings

MULTILAYERED PACKAGING FOR GREASY PRODUCTS

This application claims benefit of priority of PCT Application No. PCT/EP01/07456, filed Jun. 29, 2001 and published on Jan. 10, 2002, as WO 02/02412, and German Application Nos. 100 32 252.2, filed Jul. 3, 2000, and 100 49 665.2, filed Oct. 6, 2000.

BACKGROUND OF THE INVENTION

1. Field of the Invention

The invention relates to multilayer greaseproof packaging materials having a carrier layer which is made of paper/cardboard or other suitable substances on a polymer basis.

2. Description of the Related Art

It has been known for a long time to provide paper and cardboard containers with coatings having a barrier effect for flavors or humidity/liquids. DE 41 09 983 A1 describes a flexible packaging container comprising a composite made of a paper layer and a thermoplastic layer or film. The thermoplastic layer or film material consists of starch, a synthetic, non-polyolefinic polymer containing hydroxyl groups, e.g. an oxygenated polymer, and softeners of natural origin, e.g. polyalcohols derived from starch. Said material can be melted by supplying heat and therefore, it is extrudable. DE 41 37 802 A1 proposes to laminate a cardboard with a coated paper web to obtain a rottable, liquid-repellent product. The coating of the paper web shall be effected on a starch basis, e.g. on potato starch basis. DE 42 94 110 discloses a coating dispersion which is prepared from copolymers of oxidized starch and styrene, butadiene, acrylic acid or similar polymerizable molecules. Said dispersion reduces the gas and water permeability of cardboard or paper.

However, it is often necessary to provide packaging materials which have a high resistance to grease. Thus, food for animals, bread and confectionery, sweets and chocolate require a packaging having a particularly high resistance to grease which is for example indicated by the so-called KIT numbers exhibiting values between 8 and 12. High KIT numbers represent high resistances to grease, values as from 6 already represent a good resistance to grease.

Corresponding commercially offered paper/cardboard packaging has usually been subjected to a grease-repellent surface and/or mass treatment. At present, mainly fluoropolymers are used for said mass treatment or surface treatment, up to 5% by weight of coating material being applied onto the material. Grease resistances of >6 to 8 can only be obtained by combining layer and mass treatment, grease resistances with KIT numbers of >12 cannot be guaranteed with the present systems. For example, packing dry food for animals with a low grease content (<10%) requires a mass treatment of the backside, in case of higher grease contents, a barrier is realized by mass treatment in combination with a surface coating.

Waste paper, paperboard and cardboard packaging are regularly disposed via the waste paper circuit. Thus, via the pulping process, the halogen polymers used as grease barrier either arrive at the virgin paper product or in the waste water of the process.

Starch ethers are known as auxiliary agents and starting materials in the paper industry. The properties used are described in detail in the pertinent literature. They are used in surface coating and coating, respectively, and in pigmented paper coatings. In accordance with the BGVV (Bundesinstitut für gesundheitlichen Verbraucherschutz und Veterinärmedizin), paper, cardboard, and paperboard admitted for food contact may also contain starch ethers (e.g. hydroxyethyl ether and hydroxypropyl ether). Further, starch ethers are used as a component of adhesives because of their good film-forming property and their water bonding capacity. Respective literature is to be found for example in Ullmanns Enzyklopäidie der technischen Chemie; W. Baumann/B. Herberg: Papierchemikalien—Fakten zum Umweltschutz (Springer-Verlag); O. B: Wüirzburg: Modified Starches: Properties and Uses (CRC Press).

Further, it is known that starch ether derivatives can be processed to foils/films from an aqueous solution, particularly using casting technology.

When preparing the starch ethers in accordance with the so-called Slurry method, the aqueous starch suspension is derivatized under alkaline conditions at temperatures of up to 50° C. The degree of substitution (DS) is substantially around 0.2. The preferred derivatization at the $C_2$ atom is characteristic for said methods. Another method which is substantially known from scientific examinations (autoclave method) is based on alkaline-activated starch and realizes more homogeneous derivatizations at lower TS (i.e. dry substance) concentrations, the degree of substitution (DS), however, being adjusted similarly. Proceeding in accordance with said strategy is described in DE 42 23 471 A1, the starch ethers obtained according to this document being intended to be used for the preparation of films, particularly for use as overhead, copying, and printing films or for the surface finishing of special papers, and as packaging material. Further, it is indicated in said publication that the ether derivative films mentioned therein can be used in combination with other materials.

SUMMARY OF THE INVENTION

The object of the present invention is to provide packaging materials which are admissible according to food law, and which are greaseproof.

Surprisingly, it was found that substrates which themselves do not provide sufficient resistance to grease, such as paper, cardboard, paperboard, or other materials which are made of or contain cellulose, are greaseproof when coated with alkylene-oxide-derivatized starch.

Therefore, the present invention provides multilayer packagings for greasy products or parts of said packagings, said packagings comprising a carrier layer made of a polymer material as the main component, and at least one layer applied onto said carrier layer and not forming the outer side of said packaging, said layer applied onto said carrier layer containing an alkyene-oxide-derivatized starch as the main component. The alkylene oxide used for this purpose can suitably be a $C_2$–$C_6$ alkylene oxide. $C_2$–$C_4$ alkylene oxides are preferred.

DETAILED DESCRIPTION OF PREFERRED EMBODIMENTS

By coating a carrier material with the functional layer of a "starch derivative", a greaseproof composite system is realized. The starch component is responsible for the resistance to grease and additionally has the property of being biologically degradable. Moreover, such a starch can be suitably incorporated into coating masses for the purpose indicated, since—in contrast to native starch—it is not susceptible to re-aggregation (retro gradation).

The packagings according to the invention are not limited to specific embodiments. An exemplary, preferred field of application comprises packagings of foodstuffs and food for animals which simultaneously have a low water content and a high grease content, particularly folding boxes. Respective examples are packagings for biscuits or cookies, chocolates, other sweets, dry food for animals for which a particularly good barrier against the passage of water vapor is not required. In addition, packagings for fat-containing non-foods (e.g. cosmetics, oil-containing color pigments, or the like) can be embodied in accordance with the invention.

Further possibilities of applications are the coating of polymers other than cellulose with the material proposed according to the invention (e.g. other packaging plastics) for similar packaging requirements. Another possible use is the coating of paper intended as a wrapping paper.

With the packaging materials according to the present invention, high resistances to grease are realized corresponding to KIT numbers in the range of from 6, particularly at least of from 8, but usually substantially higher. Thus, resistances having a KIT number of 10 or 12, in extreme cases of even more than 21, can be achieved which cannot be guaranteed with the previous, non-bio-compatible and non-bio-degradable systems.

Further advantages of the packagings according to the invention are compatibility of their production with usual methods of the paper and cardboard production and biological degradability; said packagings, in comparison with usual systems, being classified as particularly advantageous with regard to the economic and/or ecologic evaluation, particularly to the coating costs, including process costs, and the compatibility with the paper recycling process.

Due to their bio-degradability, the packagings according to the invention ensure a good compatibility with the recycling and waste water purification possibilities of waste paper disposal facilities. The degradation behavior in the paper circuit represents a decisive advantage in the sense of avoiding the introduction of additional interfering substances.

Particularly suitable materials for the carrier layer are paper, paperboard or cardboard, if desired in mixture with other suitable materials or materials usual or admissible in the packaging technology of foodstuffs, such as binders or colorants. But also other materials, preferably materials on the basis of natural polymers, such as cellulose or the like, or plastics can be used.

Starch derivatives which are suitable according to the invention are starch derivatives which have been derivatized with an alkylene oxide, such as ethylene oxide or propylene oxide, or with a longer-chain alkylene oxide. The attached radicals enlarge the distances between the molecular chains and thus increase their mobility. The inner softening effect thus provided can only be undone by destroying the chemical bonds.

The starch derivative should preferably form a continuous film on the carrier layer. If this is the case, already very thin layers with a weight per unit area as from 6 g/m² can be greaseproof, provided that the carrier material has a relatively high evenness.

The coating can be provided as a surface layer of the inner side of the packaging and/or as an intermediate layer, optionally having the function of an adhesive layer between paper or cardboard layers or the like. Also several coatings applied one directly onto the other can be advantageous. Further, a so-called prime-coating (e.g. with usual paper coating substances, like kaolin or starch) can be applied prior to the coating with the starch derivative, said prime-coating serving the purpose of calendering or polishing (smoothing) the surface in advance. Weights per unit area for achieving defect-free layers can thus be reduced.

The layer containing the starch derivative can optionally be placed onto the carrier layer by applying a self-supporting layer made of this material. Preferably, however, a solution or a suspension of the starch derivative is prepared using a suitable quantity of dry substance, and is applied onto the carrier material; it is preferably an aqueous solution or a suspension. A well-suited quantity of dry substance (TS) of the starch derivative is in the range of about 5 to about 50% by weight, preferably in the range of from about 10 to about 40% by weight, the quantity to be actually selected depending on the intended application method. Thus, in some cases, a quantity of down to 4% by weight may be sufficient.

The application can for example be effected with a knife (or "doctor blade"), by spraying or by roller application, also by "pressure casting" of a more concentrated solution, and by application of a thermo-plasticized melt ("extrusion") to the surface of the carrier. In any case, the water content of the starch derivative should be reduced to preferably <25% by weight after application onto the carrier material (e.g. by infrared or convection drying).

Besides the starch derivative, the layer to be applied onto the carrier layer may contain additional additives. On the one hand, the addition of pigments (as it is customary in the paper industry) offers itself, on the other hand, glycerol, urea, borax, glyoxal or other additives having similar properties and effects can be added in order to achieve desired values with respect to elasticity, water stability, and long-term stability. Also, the KIT value can sometimes be influenced positively by adding such substances, e.g. by adding glycerol or curing agents (e.g. glyoxal). The proportion of starch derivative should preferably be in an amount to ensure the formation of a defect-free film.

Preferably, native starches, such as corn (maize), wheat, pea, potato, or tapioca starch, are used as starting materials.

The modification is for example effected with a $C_2$ or $C_3$ alkylene oxide. Propylene oxide is preferred.

Since the starch is suitably modified in the presence of a base, although the mass provided for the coating should advantageously react substantially neutrally, which implies that normally, neutralization with acid has to be effected, the modified starch is usually highly charged with salts. Advantageously, said salt content should not be too high, particularly when using the particularly preferred corn or wheat starch. Therefore, it is recommended that the coating mass in the concentration provided for the application should have a conductivity of not more than 4,000 to 5,000 µS/cm, preferably of <2,000 µS/cm.

The addition of acids and bases should be effected under the aspect that the occurring salt is generally recognized as safe with regard to food law. Suitable acids are phosphoric acids, a suitable base is sodium hydroxide. The desalination can for example be effected by dialysis.

Coatings with higher-derivatized starches present more favorable KIT numbers than those with lower degrees of derivatization. Corresponding positive effects, however, also depend on the origin of the starch used. In accordance with the invention, the degree of derivatization is in the range of between 0.1 to 1.0, preferably of between 0.1 and 0.3.

The preparation of a starch ether solution suitable as a coating material or casting solution or the like for the present invention can for example be effected as follows: The starch (e.g. wheat, corn, tapioca, potato, or HA pea starch, e.g. from peas) is stirred for several hours in approximately twice its weight of water and subsequently roughly released from water, e.g. by sucking-off. The starch absorbs approximately its own weight of water, so that it contains about 40 to 60% of dry substance. Subsequently, it is re-suspended in about 1.5 times of its wet weight and disintegrated by addition of the same quantity of about a 10% base or sodium hydroxide. Immediately thereafter, within several minutes up to about one hour, alkylene oxide, preferably propylene oxide, in a quantity of from about 25 to 75% by weight relative to the basic weight of the dry starch is added, maintaining mild temperatures. Room temperature is well-suited. The mixture is stirred for several hours and subsequently rested for about 20 hours; thereupon, it is neutralized with acid. In case desalination is to be carried out, dialysis against water is for example used. If desired, the desalinated solution is carefully reconcentrated.

In case propylene oxide is used in a quantity of about 50% by weight, the degree of derivatization of the starches is about 0.2, in other cases it is correspondingly higher or lower.

A desalination or separation of interfering inhomogeneities can for example also be effected by ultrafiltration. Should the concentration of the product be too high, a dilution with deionized water can be effected.

After addition of possibly desired additives (e.g. preserving agents, fillers, antistatic agents, elasticity-improving agents, curing agents), a mechanical separation using filters or a centrifuge can be carried out, if required, which simultaneously will accomplish degasification of the solution to be processed.

A coating solution which is particularly suitable for the purposes of the invention has the following rheological properties.

A dynamic viscosity of from 0.1 Pas to 40 Pas at a temperature of 25° C. and a shearing speed of 30.7 s$^{-1}$.

Viscoelastic properties of the polymer solution, the ratio of viscous to elastic proportion having Tan κ values of between 1 and 10 (50 at maximum) at a temperature of 25° C. and a shearing speed of 30.7 s$^{-1}$.

Such values can be obtained without difficulties when using the method mentioned as an example.

Further, the method offers the advantage that the starch is reacted and processed particularly carefully and continuously at relatively low temperatures (<60° C.) or completely at room temperature, which has positive effects on the coating of the carrier material. Due to the solubility in cold water after neutralization, separation, desalination and reconcentration, the starch can be processed so carefully that degradation reactions do not occur at all or only to an insignificant extent.

The aqueous casting solution can preferably be applied onto the material web (paper) at room temperature or at slightly increased temperatures, using a suitable application system (e.g. a knife).

The use of hydroxypropyl ether starches prepared according to the autoclave method, particularly from wheat starch, corn starch, or HA pea starch, has been proven to be particularly favorable, said starches being used as solutions having TS contents of from 12 to 20% by weight and degrees of derivatization (DS) of preferably from 0.1 to 1.0, more preferably of up to 0.4. In comparison with commercial samples (coated with fluorocarboxylic acids), said starches show markedly better resistances to grease, particularly also in edge portions which are particularly critical when folding boxes are used. Compared to the previously mentioned coatings using commercial starch derivatives according to the invention, the weights per unit area used for the coatings with said starches can be reduced.

Example: 713 g wheat starch is stirred for four hours in 1.3 l distilled water and subsequently filtered by sucking. The wet starch is stirred up with 1.824 l water and mixed with 1.811 g of 10% sodium hydroxide which was obtained by mixing 376 g 50% NaOH with 1.505 g water. Derivatization is effected using 323 g propylene oxide at 23° C. which is added under stirring within 20 minutes. The mixture is stirred for further 4 hours and rested for 20 hours. Neutralization is effected with 40% phosphoric acid (about 700 g). Subsequently, the solution is filled into dialysis tubes and dialyzed for about 4 days, the water being exchanged daily. The product is reconcentrated to more than 20% of dry substance using a vacuum rotation evaporator.

The starch ether obtained has a degree of derivatization of about 0.2. The conductivity of the coating mass is about 1100 μS/cm.

The below-mentioned coating masses were prepared similar to said example and applied with a knife onto a unilaterally coated chromo duplex cardboard (GD2), 310 g/m², thickness about 420 μm. After the first coating had dried (finger-dry, duration about 2 h), a second layer was applied and dried at room temperature and at about 50% room moisture for about 1 week or longer, if desired.

Three cardboard sheets of the coated samples were used to determine the coated mass by weighing (according to DIN 53 104: test of paper and cardboard, determination of the weight per unit area, September 1971) and the thickness with a caliper gauge (caliper: even/bulged, 30 SKT, MB=1 μm). Further, the KIT number for nonpolar substances was determined according to the 3M KIT test. Solvent mixtures from castor oil, toluene and heptane serve as test liquids. The KIT solution which has the highest number and stands on the sample for 15 sec. without penetrating or causing a discoloration, is the characterizing KIT number.

| Raw material | Derivatization with PPO (in % by weight relative to the raw material) | Conductivity (optionally after desaltation) | Surface application weight [g/m²] | Layer thickness [μm] | KIT-number |
|---|---|---|---|---|---|
| Wheat starch (Kröner) | 50 | 1100 | 21.5 | 33.24 | >21 |
| | 50 | 8180 | 32.6 | 29.6 | 8 |
| | 75 | 1600 | 11.2 | 25 | 9 |
| | 25 | 5150 | 31 | 34.8 | 13 |
| | 25 | 10700 | 21.1 | 27.1 | 9 |
| Corn starch (Cerestar) | 50 | 1800 | 21.5 | 34.3 | 15 |
| | 50 | 6600 | 16.3 | 20.4 | 14 |
| | 25 | 4400 | 15 | 25.9 | 14 |
| | 75 | 1340 | 4.9 | 18.6 | >21 |
| Corn starch + 5% by weight glycerol | 50 | 1800 | 15.6 | 23.1 | 19 |
| Corn starch + 2% by weight curing agent | 50 | 1800 | 16.6 | 34.7 | 15 |
| Potato starch | 50 | 870 | 21 | 18.7 | 9 |
| Amylex 20/20 (Südstärke) | 50 | 3700 | 18.1 | 18.4 | 6 |
| Tapioka starch (Cerestar) | 50 | 840 | 8.6 | 221 | 8 |
| | 50 | 12200 | 11.3 | 23 | 8 |
| HA pea starch, 18% by weight TS | ~50 | | | | >16 |

Multilayer Packaging for Greasy Products

The present invention relates to a multilayer packaging for greasy products or part of said packaging, comprising
- a carrier layer made of a polymer material as the main component, and
- at least one layer applied onto said carrier layer and not forming the outer side of said packaging, said layer containing a starch derivative as the main component, characterized in that said starch derivative is a starch derivative modified with a $C_2$–$C_6$ alkylene oxide. The invention further relates to the use of a starch derivatized with a $C_2$–$C_6$ alkylene oxide as the main component of a layer of a multilayer packaging said layer being applied onto a carrier layer of said packaging which is made of a polymer material, with the aim of rendering said multilayer packaging greaseproof.

The invention claimed is:

1. A multilayer packaging for greasy products or part of said packaging, comprising
    - a carrier layer made of a polymer material as the main component, and
    - at least one layer applied onto said carrier layer and providing one of a surface layer of an inner side of said multilayer packaging and an intermediate layer of said multilayer packaging, wherein the at least one layer applied onto said carrier layer (a) contains a starch derivative as the main component, wherein said starch derivative is a starch derivative modified with a $C_2$–$C_6$ alkylene oxide and has a degree of derivatization of from 0.1 to 1. and (b) has been applied from a coating solution having a dynamic viscosity of from 0.1 Pas to 40 Pas at a temperature of 25° C.

2. The multilayer packaging of claim 1, wherein said starch derivative is a starch derivative modified with a $C_2$–$C_4$ alkylene oxide.

3. The multilayer packaging or part of said packaging of claim 1, wherein said $C_2$–$C_6$ alkylene oxide is propylene oxide.

4. The multilayer packaging or part of said packaging of claim 1, wherein said starch derivative was obtained by modification of corn, wheat, potato, HA pea, or tapioca starch.

5. The multilayer packaging or part of said packaging of claim 1, wherein said starch derivative has a degree of derivatization of from 0.2 to 0.3.

6. The multilayer packaging or part of said packaging of claim 1, wherein said polymer material of said carrier layer is a polymer occurring in nature.

7. The multilayer packaging or part of said packaging in accordance with claim 1, wherein said layer containing a starch derivative as the main component contains additional components selected from among pigments, softeners, agents increasing the long-term stability, agents increasing the water stability, and agents affecting the elasticity.

8. The multilayer packaging or part of said packaging, of claim 4, wherein additional components are selected from among glycerol, urea, borax or glyoxal.

9. Use of a starch derivative, modified with a $C_2$–$C_6$ alkylene oxide as the main component of a layer of a multilayer packaging, said layer being applied from a coating solution having a dynamic viscosity of from 0.1 to 40 Pas at a temperature of 25 ° C. onto a carrier layer of said packaging, the carrier layer being made of a polymer material, so as to obtain a greaseproof multilayer packaging.

10. Use in accordance with claim 9, wherein said $C_2$–$C_6$ alkylene oxide is propylene oxide.

11. Use in accordance with any of claims 9 and 10, wherein said starch derivative was obtained by modification of optionally partly degraded corn, wheat, potato, HA pea, or tapioka starch and has a degree of derivatization of from 0.1 to 0.4.

12. Use in accordance with any of claims 9 to 11, wherein said layer contains additional components selected from among pigments, softeners, agents increasing the long-term stability, agents increasing the water stability, agents increasing the KIT value, and agents affecting the elasticity, preferably selected from among glycerol, urea, borax, or glyoxal.

13. The multilayer packaging or part of said packaging of claim 4, wherein said starch derivative was obtained by modification of corn, wheat, potato, HA pea, or tapioca starch, and wherein said corn, wheat, potato, HA pea, or tapioca starch are partly degraded.

14. The multilayer packaging or part of said packaging of claim 6, wherein said polymer material of said carrier layer is cellulose.

15. The multilayer packaging of claim 1, wherein the at least one layer applied onto said carrier layer has been applied from a coating solution having a conductivity of not more than 5,000 µS/cm.

* * * * *